United States Patent
Ganesan et al.

(10) Patent No.: US 10,459,696 B2
(45) Date of Patent: *Oct. 29, 2019

(54) COMPOSABLE ACTION FLOWS

(71) Applicant: EMC Corporation, Hopkinton, MA (US)

(72) Inventors: Ramkumar Ganesan, Bangalore (IN); Sachin G. Totale, Pleasanton, CA (US); Marwan Suliman, Dublin, CA (US); Venugopal Paramala, Bangalore (IN)

(73) Assignee: EMC Corporation, Hopkinton, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/815,617

(22) Filed: Nov. 16, 2017

(65) Prior Publication Data
US 2018/0074793 A1    Mar. 15, 2018

Related U.S. Application Data

(63) Continuation of application No. 14/136,316, filed on Dec. 20, 2013, now Pat. No. 9,851,951.

(51) Int. Cl.
*G06F 8/30*    (2018.01)
*G06F 9/451*    (2018.01)

(52) U.S. Cl.
CPC ............ *G06F 8/30* (2013.01); *G06F 9/453* (2018.02)

(58) Field of Classification Search
CPC ..... G06F 8/10; G06F 8/20; G06F 8/30; G06F 8/34; G06F 8/36; G06F 8/443; G06F 9/453; G06F 9/5038

USPC .................................................. 717/100–162
See application file for complete search history.

(56) References Cited

U.S. PATENT DOCUMENTS

| | | |
|---|---|---|
| 4,910,660 A | 3/1990 | Li |
| 5,079,690 A | 1/1992 | Li |
| 5,644,738 A | 7/1997 | Goldman |
| 6,226,627 B1 | 5/2001 | Polak |
| 6,304,886 B1 | 10/2001 | Bernardo |
| 6,724,403 B1 | 4/2004 | Santoro |
| 7,013,469 B2 | 3/2006 | Smith |
| 7,225,425 B2 | 5/2007 | Kompalli |
| 7,234,140 B2 * | 6/2007 | Dortmans ............ G06Q 10/06 707/999.004 |
| 7,299,244 B2 * | 11/2007 | Hertling ............... G06Q 10/06 707/694 |
| 7,503,033 B2 * | 3/2009 | Meredith ............ G06F 17/2205 717/102 |

(Continued)

OTHER PUBLICATIONS

Eloone, "How does a web session work? Finally illustrated with diagrams", Oct. 2013, the webpage, Machines are Digging, 8 pages.

(Continued)

*Primary Examiner* — Marina Lee
(74) *Attorney, Agent, or Firm* — Van Pelt, Yi & James LLP

(57) ABSTRACT

Composable action flows are disclosed. In various embodiments, a definition of one or more processing steps comprising an action flow is received. A definition of one or more transitions between processing steps comprising the action flow is received. The processing step and transition definitions are used to generate programmatically application code to implement the action flow.

20 Claims, 6 Drawing Sheets

(56) References Cited

U.S. PATENT DOCUMENTS

| | | |
|---|---|---|
| 7,734,995 B1 | 6/2010 | Saikaly |
| 7,797,432 B2 | 9/2010 | Volodarsky |
| 7,933,632 B2 | 4/2011 | Flynt |
| 8,156,481 B1 | 4/2012 | Koh |
| 8,271,899 B1 | 9/2012 | Blackburn |
| 8,321,681 B2 | 11/2012 | Tulchinsky |
| 8,346,889 B1 | 1/2013 | Chiu |
| 8,504,400 B2* | 8/2013 | Purcell .................. G06F 9/5072 705/7.11 |
| 8,560,959 B2 | 10/2013 | Zaman |
| 8,572,268 B2 | 10/2013 | Wray |
| 9,426,258 B1 | 8/2016 | Salvi |
| 9,529,572 B1 | 12/2016 | Totale |
| 9,851,951 B1* | 12/2017 | Ganesan .................. G06F 8/30 |
| 2002/0194393 A1 | 12/2002 | Hrischuk |
| 2003/0004770 A1 | 1/2003 | Miller |
| 2003/0023641 A1 | 1/2003 | Gorman |
| 2003/0222906 A1 | 12/2003 | Fish |
| 2003/0233374 A1* | 12/2003 | Spinola .................. G06Q 10/02 |
| 2004/0044987 A1 | 3/2004 | Kompalli |
| 2004/0111430 A1 | 6/2004 | Hertling |
| 2005/0022157 A1 | 1/2005 | Brendle |
| 2005/0114849 A1 | 5/2005 | Megiddo |
| 2005/0149908 A1 | 7/2005 | Klianev |
| 2005/0166207 A1 | 7/2005 | Baba |
| 2006/0053421 A1 | 3/2006 | Dickenson |
| 2006/0074704 A1 | 4/2006 | Shukla |
| 2006/0074733 A1 | 4/2006 | Shukla |
| 2006/0236304 A1 | 10/2006 | Luo |
| 2006/0236306 A1 | 10/2006 | Debruin |
| 2006/0265712 A1 | 11/2006 | Zhou |
| 2007/0055591 A1 | 3/2007 | Enenkiel |
| 2007/0266368 A1 | 11/2007 | Szpak |
| 2008/0046868 A1 | 2/2008 | Tsantilis |
| 2008/0281944 A1 | 11/2008 | Vorne |
| 2009/0019386 A1 | 1/2009 | Sweetland |
| 2009/0055725 A1 | 2/2009 | Portnov |
| 2009/0210631 A1 | 8/2009 | Bosworth |
| 2009/0307670 A1 | 12/2009 | Kashyap |
| 2010/0211420 A1 | 8/2010 | Kodi |
| 2010/0281462 A1 | 11/2010 | Festa |
| 2010/0293056 A1 | 11/2010 | Flynt |
| 2011/0145037 A1* | 6/2011 | Domashchenko ..... G06Q 10/06 705/7.27 |
| 2011/0225565 A1 | 9/2011 | Van Velzen |
| 2011/0238458 A1* | 9/2011 | Purcell .................. G06F 9/5072 705/7.27 |
| 2011/0246549 A1 | 10/2011 | Katzenberger |
| 2012/0060163 A1* | 3/2012 | Khan .................. H04L 63/105 718/103 |
| 2012/0131442 A1 | 5/2012 | Grizim |
| 2012/0166992 A1 | 6/2012 | Huynh |
| 2012/0278094 A1 | 11/2012 | Kovacevic |
| 2013/0019172 A1 | 1/2013 | Kotler |
| 2013/0019182 A1 | 1/2013 | Gil |
| 2013/0205193 A1 | 8/2013 | Matsufuji |
| 2013/0219263 A1 | 8/2013 | Abrahami |
| 2014/0201232 A1 | 7/2014 | Berry |
| 2014/0245262 A1 | 8/2014 | Hill |
| 2017/0013088 A1 | 1/2017 | Salvi |
| 2017/0123765 A1 | 5/2017 | Totale |

OTHER PUBLICATIONS

W3school.com, "Window setTimeout() Method", Nov. 2012, retrieved from https://www.w3schools.com/jsref/met_win_settimeout.asp , 2 pages.

Sun Microsystems, "Understanding User Sessions and Application Sessions", 2007, retrieved from https://docs.oracle.com/cd/ E19728-01/820-2550/sessions_intro.html, 2 pages (Year: 2007).

www.gwtproject.org, "GWT—Logging", Jul. 2013, retrieved from https://web.archive.org/web/20130716153359/http://www.gwtproject.org/doc/latest/DevGuideLogging.html, 6 pages (Year: 2013).

Author Unknown, Kohana Team, Session Library, Jan. 2012, retrieved from http://www.hcs.harvard.edu/-powerpak/kohanadocs/libraries/session.html, 6 pages.

Author Unknown, w3schools.com, "HTML5 Web Storage", Nov. 2012, retrieved from https://web.archive.org/web/20121123023047/http://www.w3schools.com/html/html5_webstorage.asp, 3 pages.

Author Unknown, www.gwtproject.org, GWT, Jul. 2013, retrieved from https ://web.archive.org/web/20130708095321 /http://www.gwtproject.org/doc/latest/DevGuideHtml5Storage. html , 7 pages.

Kohana Team, "Session Library", Jan. 2012, retrieved from http://www.hcs.harvard.edu/powerpak!kohanadocs/libraries/session.html, 6 pages.

The PHP Group, "What is PHP?", Jan. 2009, retrieved from http://web.archive.org/web/20090124160056/http://php.net!manual/en/intro-whatis.php , 1 page.

The PHP Group, What is PHP?, Jan. 23, 2009.

www.gwtproject.org, "GWT", Jul. 2013, retrieved from https://web.archive.org/web/20130708095321/http://www.gwtproject.org/doc/latest!DevGuideHtmi5Storage.html , 7 pages.

* cited by examiner

COMPOSABLE ACTION FLOWS

CROSS REFERENCE TO OTHER APPLICATIONS

This application is a continuation of co-pending U.S. patent application Ser. No. 14/136,316 entitled COMPOSABLE ACTION FLOWS filed Dec. 20, 2013 which is incorporated herein by reference for all purposes.

BACKGROUND OF THE INVENTION

An application user interface, e.g., one accessed by a client system via a network using a browser or other software, may include one or more application pages. A page may include one or more widgets and/or other elements; one or more data sources (e.g., services); and/or one or more action flows or other business logic.

Software development tools enable developers, consultants, business analysts, etc. to create applications, including by designing the user interface pages of the application. Typically, the application logic (e.g., action flows) available via such development tools is limited to a predefined set designed and incorporated into the development tool by a provider of the tool.

BRIEF DESCRIPTION OF THE DRAWINGS

Various embodiments of the invention are disclosed in the following detailed description and the accompanying drawings.

DETAILED DESCRIPTION

Figure 1:
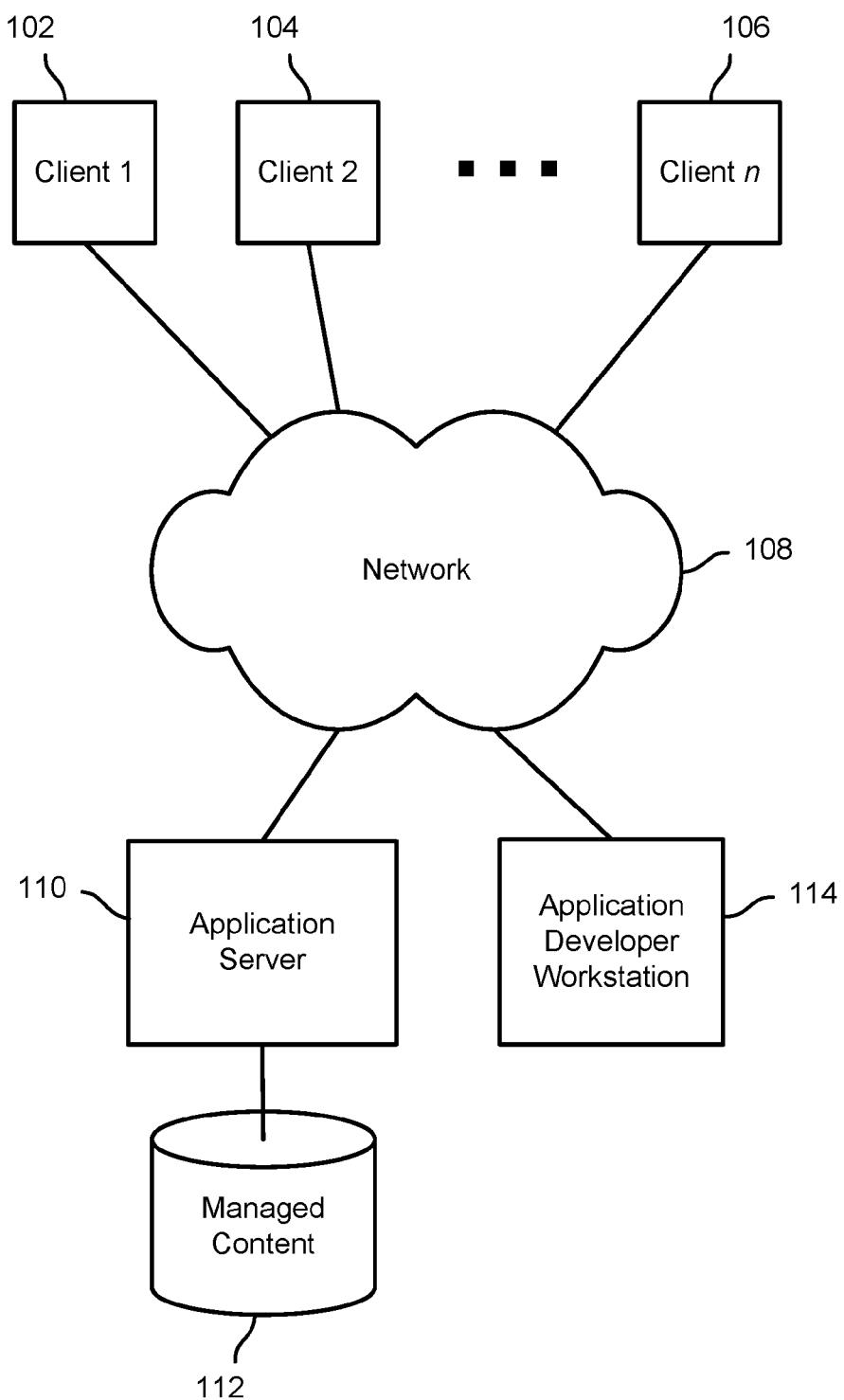
FIG. 1 is a block diagram illustrating an embodiment of an application development system and environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Composable action flows are disclosed. In various embodiments, a definition of an action flow is received, e.g., via a software development tool user interface. The definition may include an identification of one or more steps comprising the action flow; one or more inputs and/or outputs for each; and/or for each of at least a subset of the steps a specification of a transition from the step to one or more other steps comprising the action flow. In some embodiments, an input may be specified to be determined at runtime, e.g. by evaluating at runtime an expression based on application or other context data. In some embodiments, a transition may be determined at runtime by evaluating an expression and/or other logic, e.g. based on an application or other context data. In some embodiments, a transition label, such as a text string or other label to be displayed to a user, for example on a button or other user-selectable control configured to trigger a transition, may be determined dynamically at runtime, e.g., by evaluating an expression. Expressions to determine an input, transition, transition label, etc. may include as arguments one or more of an application context data, an application user interface event payload data, etc. In some embodiments, an action flow output may be provided as an application variable, an application user interface event payload, etc.

FIG. 1 is a block diagram illustrating an embodiment of an application development system and environment. In the example shown, a plurality of client systems, representing in FIG. 1 by client systems 102, 104, and 106, connect via a network 108 to an application server 110 associated with a body of managed content 112. In some embodiments, the managed content 112 may be stored in a content management system, such as an EMC® Documentum® system. In various embodiments, a software developer or other user associated with application developer workstation 114, e.g., a personal or other computer, may use a software development tool to create an application to run on application server 110. For example, in some embodiments a developer may use the "xCP Designer" and/or other components comprising the EMC® Documentum® xCP development platform to create applications to run on application server 110, for example in a runtime environment provided on application server 110. The EMC® Documentum® xCP development platform, for example, enables a developer to use visual and other tools to build custom applications that leverage the advanced enterprise content management (ECM) capabilities of EMC® Documentum®.

In various embodiments, a visual or other development tool interface to enable developers to compose developer-composed custom action flows and associate custom action flows with developer-designed application page and/or other elements is provided, e.g., via application development workstation 114. Definitions are received via the interface and stored. The definitions are used to generate application code which at runtime to implement action flows as defined by the developer.

Figure 2:
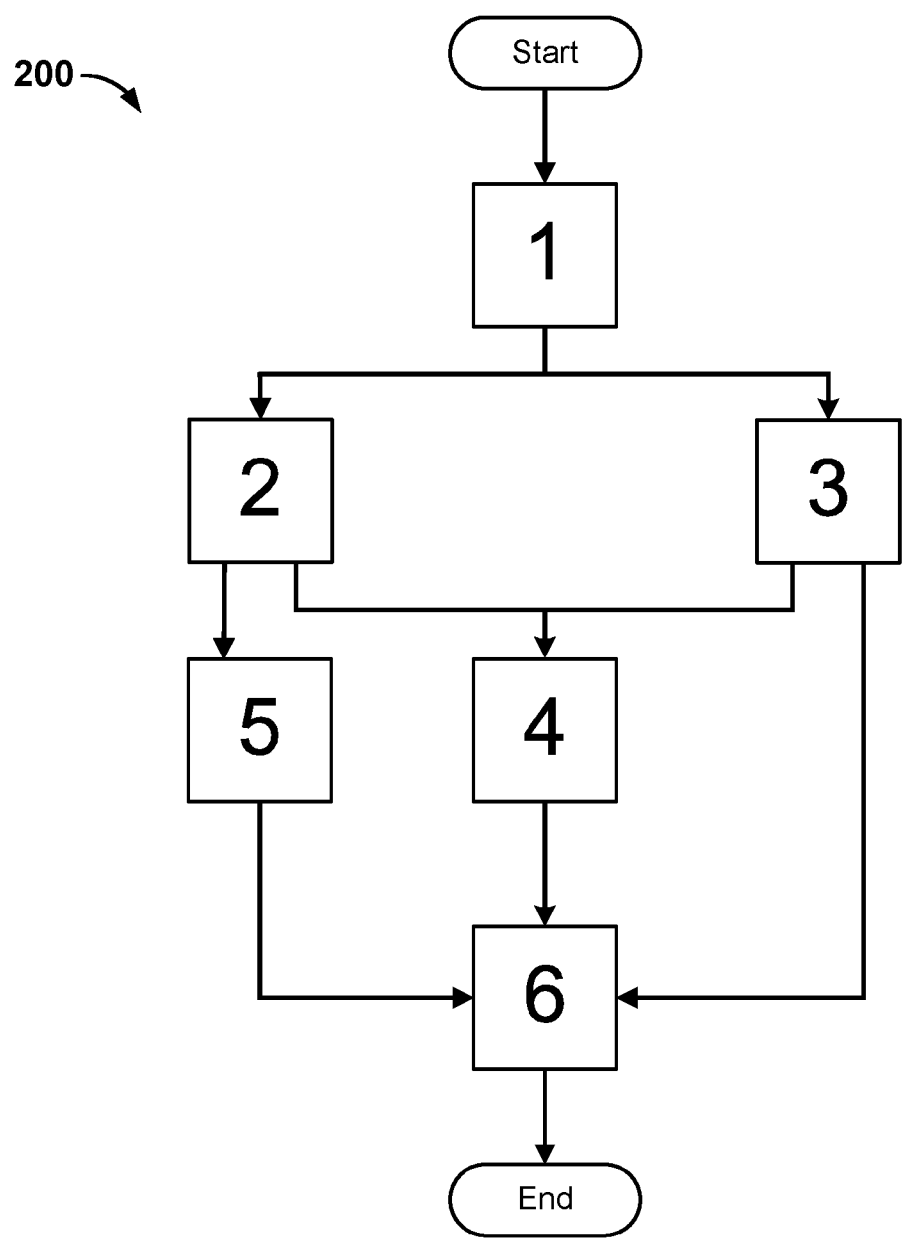
FIG. 2 is a block diagram illustrating an example of an application action flow.

FIG. 2 is a block diagram illustrating an example of an application action flow. In the example shown, the action flow 200 includes a plurality of steps, identified by numbers "1" through "6", each with a predefined set of one or more transitions to one or more next steps in the action flow. In the example shown, an instance of the action flow may progress from step "1" to either step "2" or step "3", for example depending on a condition, event, expression, and/or logic evaluated at runtime. Similarly, from step "2" for example, an instance of the action flow may progress to either step "4" or step "5", and from either of the latter steps to step "6" and completion.

Figure 3:
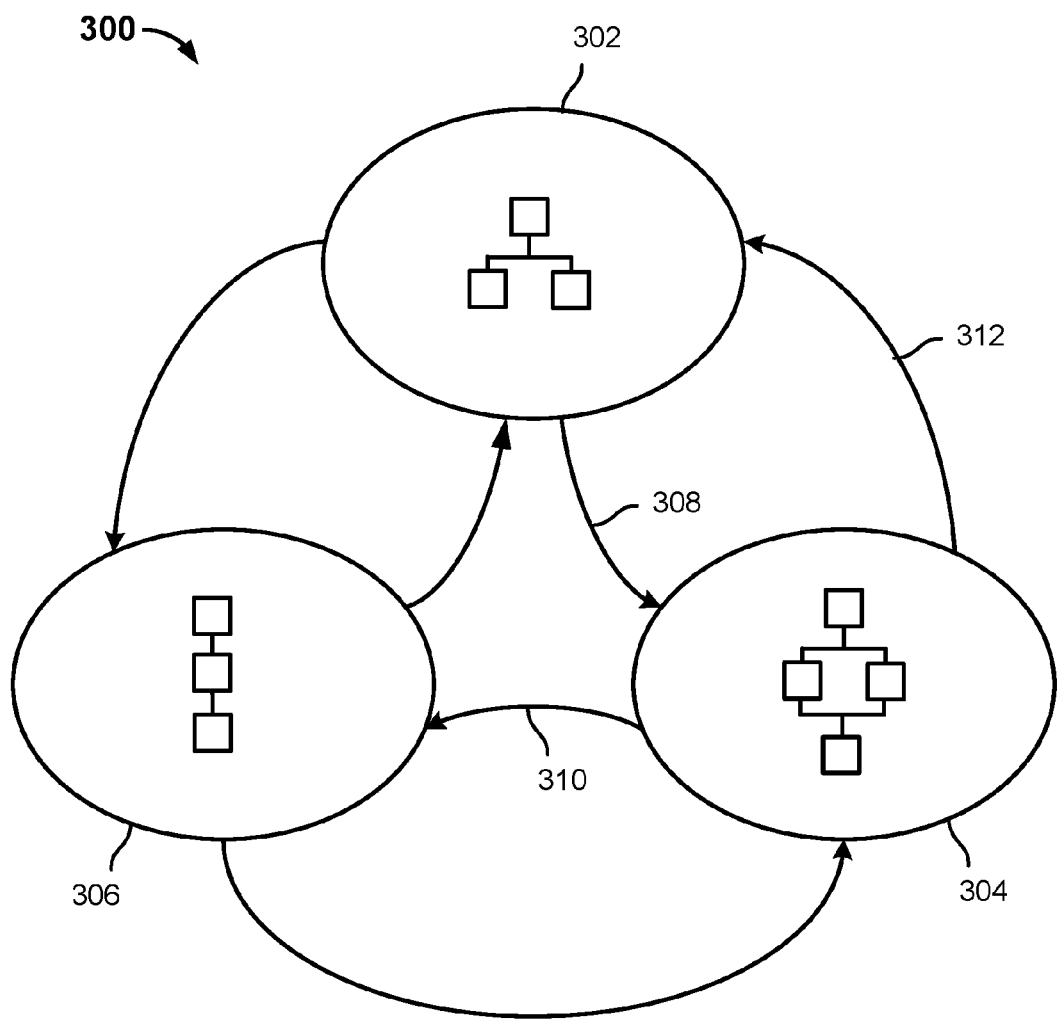
FIG. 3 is a block diagram illustrating an embodiment of a developer-composed application action flow.

FIG. 3 is a block diagram illustrating an embodiment of a developer-composed application action flow. In the example shown, a developer is not constrained to incorporate action flows from a limited set and instead is provided with a developer user interface to define action flow steps and the transitions between them. In the example shown, the action flow 300 includes three processing steps 302, 304, and 306, and for each processing step a first transition to a first of the other steps and a second transition to a second of the other steps. For example, the step 302 has a transition 308 to step 304, which in turn has a transition 310 to step 306. Note in the example shown the developer was not limited to defining a unidirectional linear flow. Instead, from step 304 for example an instance of the action flow 300 could progress via transition 312 back to step 302.

The small squares shown connected by lines in each of the steps 302, 304, and 306 represent processing performed in that step. In various embodiments, expressions, application user interface event, or other conditions or inputs may be defined by the developer to result in a transition to another step in the action flow and/or to cause the action flow to "finish". In various embodiments, a transition may occur before all of the processing defined for a step has been completed. In some embodiments, a transition may be defined via an expression or other logic to result in a different behavior at runtime under different contexts, for example based on the value of one or more application variables or other parameters, one the state and/or output of a business logic or work flow, and/or an attribute of a business or other object currently being accessed or otherwise used by the application.

Figure 4:
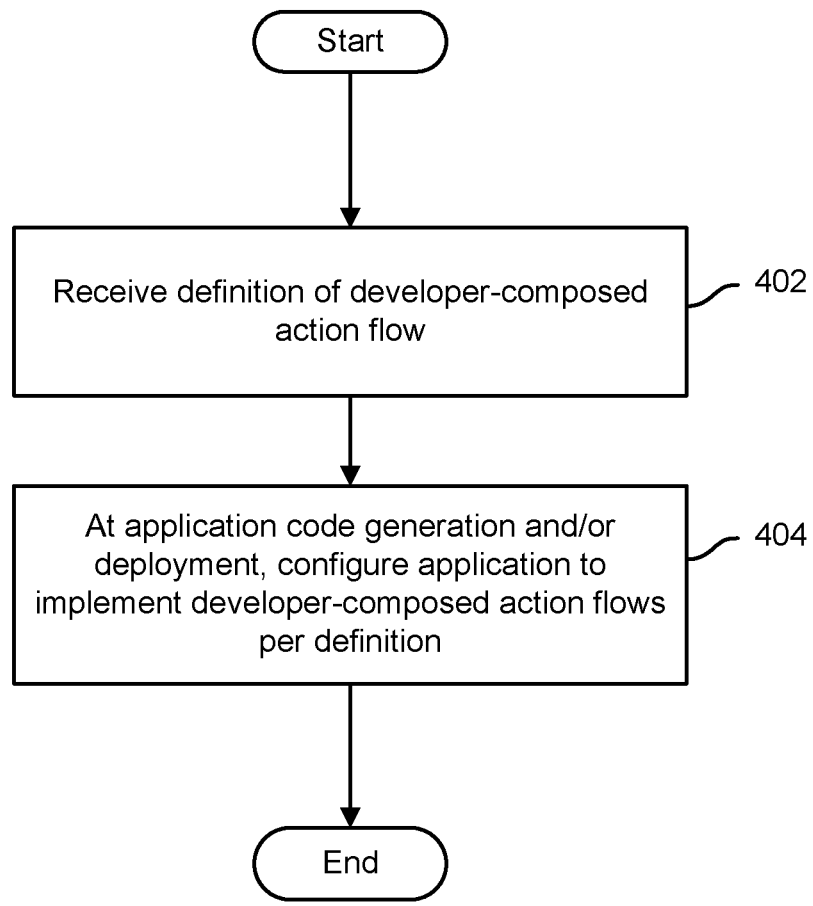
FIG. 4 is a flow chart illustrating an embodiment of a process to compose an action flow.

FIG. 4 is a flow chart illustrating an embodiment of a process to compose an action flow. In the example shown, a definition of a developer-composed action flow is received (402). In various embodiments, the definition may be received via a developer user interface of a software development tool. At application code generation and/or deployment time, application code is included to implement the developer-composed action flows, per the definition received via the development tool interface (404).

Figure 5:
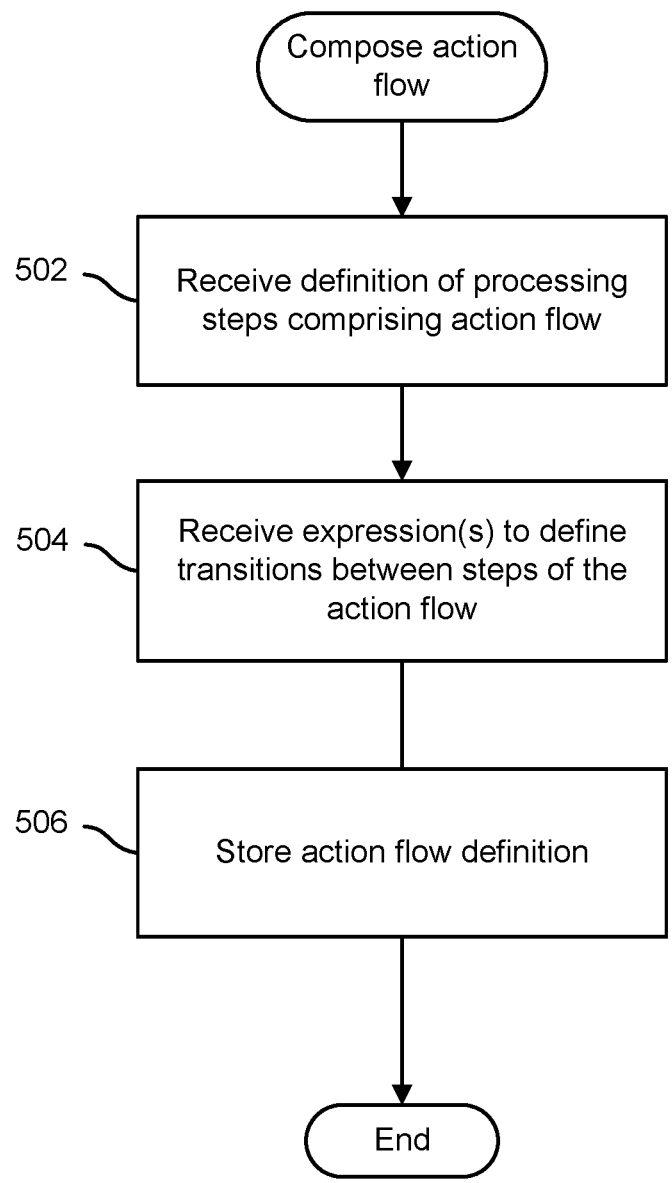
FIG. 5 is a flow chart illustrating an embodiment of a process to compose an action flow.

FIG. 5 is a flow chart illustrating an embodiment of a process to compose an action flow. In various embodiments, step 402 of FIG. 4 may include all or part of the process of FIG. 5. In the example shown, a definition of one or more processing steps is received (502). For example, application logic, functions, calls to external data source or other services, or other processing may be defined. For each processing step, one or more expressions or other transition definitions are received (504). Each transition defines how the transition may be triggered and a destination step is specified. In some embodiments, the destination step may be determined dynamically at runtime, e.g., by evaluating an expression specified by the developer using the development tool. In some embodiments, a transition label, such as a text to be displayed on a button or other user-facing control which upon selection by the user triggers a transition, may be determined dynamically at runtime. For example, in a wizard-like sequence, one or more transition labels for buttons labeled "previous", "next", or "finish" may be determined dynamically. For example, the label "finish" may be determined to be appropriate when based on the steps that have already been completed and/or context data, such as user input in previous steps, a transition to a "finish" phase may be available, desired, and/or appropriate.

In various embodiments, an expression associated with a transition may use as an argument one or more of an application or other context variable, a parameter associated with a current application and/or user session, a payload or other data value associated with an application user interface or other event, and/or an attribute of a business or other software object with respect to which an instance of the action flow is being performed. The action flow definition is stored, e.g., for use at application code generation time to generate application code to implement the action flow as composed by the developer and/or at runtime to manage instances of the action flow.

Figure 6:
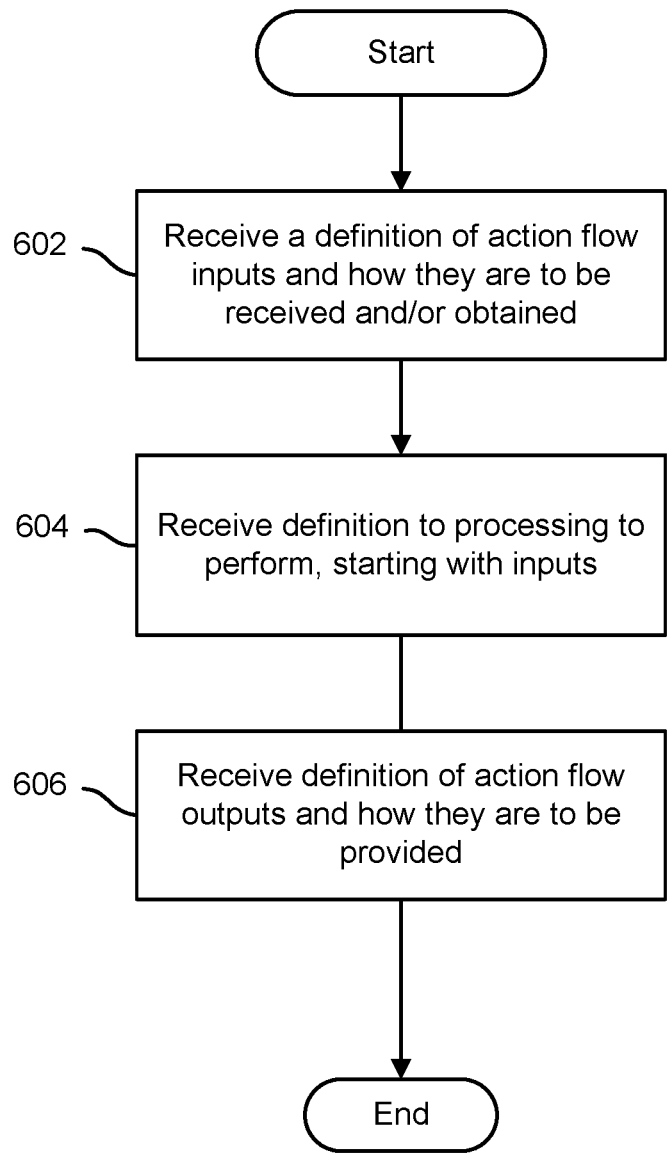
FIG. 6 is a flow chart illustrating an embodiment of a process to compose an action flow.

FIG. 6 is a flow chart illustrating an embodiment of a process to compose an action flow. In the example shown, a definition of one or more action flow inputs is received (602). In various embodiments, a development tool or other interface enables an application developer to define an input, its attributes (e.g., type), and default/initial values. In some embodiments, a default/initial value may be defined by the developer to be determined dynamically at runtime, e.g., based on an expression or other logic using as input an application context data, application user interface event payload, user input, business or other object type or other attribute information, etc. A definition of processing to be performed in the step, e.g., starting with the one or more inputs, is received (604). Examples include, without limitation, invoking a function, performing a computation, retrieving a data object or other external data, invoking an application component or service, and/or invoking an external service. A definition of one or more outputs to be provided by the action flow and/or step thereof, and how each output is to be provided, is received (606). In various embodiments, a developer may specify an output to be provided by setting a value of an application or other context data, generating an application user interface or other event having the output value as a payload, etc.

In some embodiments, a developer may specify application user interface or other events to be published by one or more steps of an action flow. For example, in some embodiments, a "wizard" type interface or other child dialog may be defined. The developer may specific events to be published at desired points within the wizard or other child dialog flow. Application page elements comprising the parent page may be configured (e.g., based on the developer's page definition) to subscribe to the events, and perform some action in response to receipt of an event and/or associated payload. Similar, once the wizard or other child dialog advances to the "finish" or other terminal stage, one or more outputs may be provided as disclosed herein, e.g., by evaluating one or more expressions at runtime to determine one or both of a value of the output(s) and a destination, e.g., a target application page, widget, or other component.

Enable a developer to compose action flows, including action flow inputs, outputs, and transitions, as disclosed herein enables a dynamic application user experience to be provided.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving a definition of one or more processing steps comprising an action flow;
   receiving a definition of one or more transitions between processing steps comprising the action flow, wherein the action flow is configured to transition from a substep of a processing step of the one or more processing steps to a first substep of a different processing step of the one or more processing steps before each of the one or more substeps of the processing step is completed based on a transition associated with the processing step, wherein the action flow is configured to transition from a sub step of the different processing step back to a first step of the processing step; and
   using the processing step and transition definitions to generate programmatically application code to implement the action flow.

2. The method of claim 1, wherein the definition of the one or more processing steps includes a definition of an input to the action flow.

3. The method of claim 2, wherein the definition of an input to the action flow specifies an expression or other logic to be evaluated at runtime to determine a value of the input to the action flow.

4. The method of claim 2, wherein the input to the action flow includes one or more of the following: an application context data, a session parameter, user context data, and other context data.

5. The method of claim 1, wherein the definition of the one or more processing steps includes a definition of an output of the action flow.

6. The method of claim 5, wherein the definition of the output of the action flow specifies how the output of the action flow is to be provided.

7. The method of claim 6, wherein the definition of the output of the action flow specifies that the output is to be provided as a payload of an application user interface event specified in the definition.

8. The method of claim 1, wherein the definition of one or more transitions includes for each of the one or more transitions an expression to be evaluated at runtime.

9. The method of claim 8, wherein the expression specifies a condition under which the transition is to occur.

10. The method of claim 8, wherein the expression specifies a destination step to which the transition should be made.

11. The method of claim 8, wherein the expression includes an argument comprising an application or other context data.

12. The method of claim 8, wherein the expression includes an argument comprising an application user interface event payload.

13. A system, comprising:
   a data storage device; and
   a processor coupled to the data storage device and configured to:
      receive and store in the data storage device a definition of one or more processing steps comprising an action flow;
      receive and store in the data storage device a definition of one or more transitions between processing steps comprising the action flow, wherein the action flow is configured to transition from a substep of a processing step of the one or more processing steps to a first substep of a different processing step of the one or more processing steps before each of the one or more substeps of the processing step is completed based on a transition associated with the processing step, wherein the action flow is configured to transition from a substep of the different processing step back to a first step of the processing step; and
      use the processing step and transition definitions to generate programmatically application code to implement the action flow.

14. The system of claim 13, wherein the data storage device comprises a memory device.

15. The system of claim 13, wherein the definition of the one or more processing steps includes a definition of an input to the action flow.

16. The system of claim 15, wherein the definition of the input to the action flow specifies an expression or other logic to be evaluated at runtime to determine a value of the input to the action flow.

17. The system of claim 13, wherein the definition of one or more transitions includes for each of the one or more transitions an expression to be evaluated at runtime.

18. The system of claim 17, wherein the expression specifies a condition under which the transition is to occur.

19. A computer program product embodied in a non-transitory computer readable storage medium and comprising computer instructions for:
   receiving a definition of one or more processing steps comprising an action flow;
   receiving a definition of one or more transitions between processing steps comprising the action flow, wherein the action flow is configured to transition from a substep of a processing step of the one or more processing steps to a first substep of a different processing step of the one or more processing steps before each of the one or more substeps of the processing step is completed based on a transition associated with the processing step, wherein the action flow is configured to transition from a sub step of the different processing step back to a first step of the processing step; and
   using the processing step and transition definitions to generate programmatically application code to implement the action flow.

20. The computer program product of claim 19, wherein the definition of the one or more processing steps includes a definition of an input to the action flow, wherein the definition of the input to the action flow specifies an expression or other logic to be evaluated at runtime to determine a value of an input to the action flow.

* * * * *

UNITED STATES PATENT AND TRADEMARK OFFICE
CERTIFICATE OF CORRECTION

PATENT NO. : 10,459,696 B2
APPLICATION NO. : 15/815617
DATED : October 29, 2019
INVENTOR(S) : Ramkumar Ganesan et al.

Page 1 of 1

It is certified that error appears in the above-identified patent and that said Letters Patent is hereby corrected as shown below:

In the Claims

In Column 5, Line 24, delete "sub step" and insert --substep--, therefor.
In Column 6, Line 53, delete "sub step" and insert --substep--, therefor.

Signed and Sealed this
Thirty-first Day of March, 2020

Andrei Iancu
*Director of the United States Patent and Trademark Office*